US007117160B1

(12) United States Patent
Haynes et al.

(10) Patent No.: US 7,117,160 B1
(45) Date of Patent: Oct. 3, 2006

(54) SYSTEM AND METHOD FOR ELIMINATING AN UNNECESSARY DISPATCH OF A SERVICE TECHNICIAN

(75) Inventors: Cheryl Camp Haynes, Marietta, GA (US); Trena Lynn Smith, Kennesaw, GA (US); Ronald D. Stanley, Stockbridge, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/474,643

(22) Filed: Dec. 29, 1999

(51) Int. Cl.
*G06Q 10/00* (2006.01)
(52) U.S. Cl. .............................. 705/8; 705/9
(58) Field of Classification Search .............. 705/8,
705/7, 9, 11; 379/10.01, 15.01, 1.01, 27.01,
379/29.01, 14, 399.01, 14.01, 26.01, 26.02,
379/18, 32.01, 242, 243, 245, 258, 280
See application file for complete search history.

(56) References Cited

U.S. PATENT DOCUMENTS

| | | | | |
|---|---|---|---|---|
| 4,922,514 A | * | 5/1990 | Bergeron et al. | 379/29.01 |
| 5,467,268 A | * | 11/1995 | Sisley et al. | 705/9 |
| 5,491,742 A | * | 2/1996 | Harper et al. | 379/201.12 |
| 5,590,269 A | * | 12/1996 | Kruse et al. | 705/9 |
| 5,615,121 A | * | 3/1997 | Babayev et al. | 705/9 |
| 5,623,404 A | * | 4/1997 | Collins et al. | 705/9 |
| 5,644,619 A | * | 7/1997 | Farris et al. | 379/29.01 |
| 5,682,421 A | * | 10/1997 | Glovitz et al. | 379/100.05 |
| 5,737,728 A | * | 4/1998 | Sisley et al. | 705/8 |
| 5,790,634 A | * | 8/1998 | Kinser et al. | 379/29.01 |
| 5,913,201 A | * | 6/1999 | Kocur | 705/9 |
| 5,920,846 A | * | 7/1999 | Storch et al. | 379/15.03 |
| 5,953,389 A | * | 9/1999 | Pruett et al. | 379/9 |
| 5,963,911 A | * | 10/1999 | Walker et al. | 705/7 |
| 6,345,281 B1 | * | 2/2002 | Kardos et al. | 707/201 |
| 6,349,238 B1 | * | 2/2002 | Gabbita et al. | 700/100 |
| 6,370,231 B1 | * | 4/2002 | Hice | 379/32.01 |
| 6,587,851 B1 | * | 7/2003 | Ditcharo et al. | 707/6 |
| 6,640,101 B1 | * | 10/2003 | Daniel | 455/423 |

FOREIGN PATENT DOCUMENTS

WO      WO 95/20854      *  3/1995

OTHER PUBLICATIONS

Grenning, James, "New Testing Solutions give providers a competitve edge", Telephony, Sep. 6, 1993 [retrieved on: May 2, 2002], vol. 225, Issue 10, 4 pages.*

(Continued)

*Primary Examiner*—Eric W. Stamber
*Assistant Examiner*—Beth Van Doren
(74) *Attorney, Agent, or Firm*—Merchant & Gould

(57) ABSTRACT

The present invention is directed to a system and method for eliminating the unnecessary dispatch of a service technician. The service orders generated by the service order control system are monitored to identify service orders that require a dispatch. If a service order is identified as requiring a dispatch, then the service order is selected for further analysis. The service order is initially analyzed to determine whether the service order meets a set of predefined criteria that identify service orders that are likely to cause an unnecessary dispatch. If the service order meets the set of predefined criteria, then the service order is further analyzed to determine whether the dispatch associated with the service order is unnecessary and should be canceled. Once the dispatch is determined to be unnecessary, then the service order is corrected and the dispatch is canceled.

22 Claims, 2 Drawing Sheets

OTHER PUBLICATIONS

"AAI's twenty-one best expert systems applications", Intelligent Software Strategies, Oct. 1991 [retrieved on Nov. 17, 2002], vol. 7, No. 10, 5 pages, retrieved from: Dialog.*

Karpinski, Rich, "Rhyme and reason: artificial intelligence in the public network", Telephony, Feb. 25, 1991 [retrieved on Nov. 17, 2002], vol. 220, No. 8, 4 pages, retrieved from: Dialog.*

"NINEX cuts operational costs in 40 offices using expert system", PR Newswire, Jul. 9, 1990 [retrieved on Nov. 17, 2002], 2 pages, retrieved from: Dialog.*

Grenning, James, "New testing solutions give providers a competitive edge", Telephony, Sep. 6, 1993 [retrieved on Nov. 17, 2002], vol. 225, issue 10, 4 pages, retrieved from: Dialog.*

"AutoDISPATCH", Solomon IV Integrated Products, Jun. 5, 1998 [retrieved on Nov. 17, 2002], 5 pages, retrieved from: archive.org and google.com.*

Panykno, Steve, et al., "Cooperating to compete", Telephony, Apr. 5, 1999 [retrieved on Nov. 18, 2002], 4 pages, retrieved from: Gooogle.com.*

"TTC: TCC's T-Berd 224 Helps Telcos Analyzer Caller ID", Business Wire, Jun. 12, 1995 [retrieved on Nov. 17, 2002], 2 pages, retrieved from: Dialog.*

Flach, Dale, "Remote Test system simplifies a complex maintenance and repair predicament", Telephony, Oct. 20, 1982 [retrieved on Nov. 17, 2002], vol. 203, No. 13, 1 page, retrieved from: Dialog.*

Stark, Larry, "Entering the interactive echelons.", Telephoney, Nov. 27, 1995 [retrieved Nov. 17, 2002], vol. 229, No. 22, pp. 1-5, retrieved from: Dialog, file 148.*

"Applied Innovation Introduces New Solution for Monitoring and Provisioning Network Elements", PR Newswire, Jun. 8, 1998 [retrieved on Nov. 17, 2002], pp. 1-2, retrieved from: Dialog, file 813.*

"Task Scheduling Algorithm for a Teleprocessing Communications Controller", IBM Technical Disclosure Bulletin, Mar. 1, 1974 [retrieved May 28, 2004], 4 pages, retrieved from: IBM Technical Disclosure Database.*

MDSI Advantex, www.mdsi-advantex.com, Dec. 5, 1998 [retrieved Apr. 11, 2005], pp. 1-31, retrieved from: Google.com and archive.org.*

* cited by examiner

SYSTEM AND METHOD FOR ELIMINATING AN UNNECESSARY DISPATCH OF A SERVICE TECHNICIAN

TECHNICAL FIELD

This invention relates in general to dispatching a service technician, and more particularly to monitoring service orders to eliminate an unnecessary dispatch of a service technician.

BACKGROUND OF THE INVENTION

A service technician is often used to support the installation or repair of telephone service. Due to the cost of dispatching a service technician, it is preferable that a service technician only be dispatched when necessary and that multiple dispatches to the same location be avoided if possible. Typically, the dispatch of a service technician is initiated by a service request from a number of different sources, such as an ordering system used by an incumbent local exchange carrier and an ordering system used by a competitive local exchange carrier. Although it is preferable to avoid an unnecessary dispatch, the different sources typically do not attempt to prevent unnecessary dispatches because the performance of a particular system is not affected by an unnecessary dispatch. For example, the performance of an ordering system can be measured by how quickly a service order is generated. If so, then an ordering system generates a service order as quickly as possible, without trying to determine whether the service order will result in an unnecessary dispatch.

It is a common occurrence for an ordering system to receive a request for installation of service from one customer and a request for discontinuation of service at the same location from another customer if the first customer is moving to the location and the second customer is moving away from the location. If the ordering system receives a request from the first customer to install new service at the location, then the ordering system issues a service request that requests the installation of new service. The ordering system (or other systems involved in the installation of the new service) may not recognize that the second customer has requested discontinuation of service at the same location so that the facilities previously used by the second customer can be assigned to the first customer. If not, then different facilities may be assigned for use by the second customer and a service technician is dispatched to complete the installation. However, if the facilities previously used by the second customer can be assigned to the first customer, then the dispatch can be saved because the existing facilities are reused.

An unnecessary dispatch can also result when a customer requests the installation of service at a multifamily dwelling or office building. An address for such a building can include a building number, unit number, floor number or suite number, in addition to a street number. For example, the address for an apartment can include "Building A, Unit 102." The inconsistent use of building numbers and unit numbers in an address can result in an unnecessary dispatch because an address that uses one method of addressing is not recognized as referring to the same location as another address that uses a different method of addressing. Consider the situation where service was previously provided to an apartment using an address that includes "Building A, Unit 102." A subsequent request for installation of service is made for the same apartment, but the customer provides an address that includes "A-102," rather than "Building A, Unit 102." If the address is not recognized as referring to the same location, then new facilities are assigned and a service technician is dispatched to complete the installation. However, if the address is recognized as referring to the same location, then the facilities can be reused and the dispatch can be saved. Thus, there is a need for a system and method for monitoring the dispatch of service technicians to eliminate unnecessary dispatches.

The determination of an unnecessary dispatch should be made quickly enough so that it does not impair the response time for the dispatch of a service technician. If the time required to determine an unnecessary dispatch is too long, then the response time will suffer and customers cannot be timely served. Thus, the system and method for monitoring the dispatch of service technicians to eliminate unnecessary dispatches should not delay the dispatch of a service technician if the dispatch is necessary.

SUMMARY OF THE INVENTION

The present invention meets the needs described above by providing a system and method for eliminating the unnecessary dispatch of a service technician. The present invention can be used in connection with the existing processes and systems that are used to generate service orders and manage the dispatch of service technicians without delaying the dispatch of a service technician when necessary.

In one aspect of the invention, a system, such as the trap service order system, is provided for monitoring service orders to eliminate unnecessary dispatches. Service orders are initiated by service requests that are generated by a variety of different sources, such as different local exchange carriers. The service requests are received by a service order control system which reviews the requests and generates service orders for the received service requests.

Once a service order is generated, the service order is sent to a loop facility assignment control system. The loop facility assignment control system assigns any facilities required by the service order. The service order control system then transmits the service order, including the facilities information, to the integrated service process (ISP) in the work management center. The ISP determines whether a service order requires the dispatch of a service technician. If so, then the ISP communicates with the MAPPER system and the MAPPER system generates a dispatch order. The dispatch order is assigned a number or other type of identifier for tracking purposes and is placed in a queue for execution.

The trap service order system monitors the service orders output from the service order control system to the ISP by receiving a duplicate drop of the service orders. The trap service order system determines whether a service order indicates that a dispatch is required. If the service order indicates that a dispatch is required, then the trap service order system further examines the service order to determine whether an unnecessary dispatch can be avoided. If the trap service order system determines that an unnecessary dispatch can be avoided, then the trap service order system communicates with the service order control system and the service order is corrected. The MAPPER system recognizes that the service order has been corrected and cancels the existing dispatch order to eliminate the unnecessary dispatch.

In another aspect of the invention, a method for eliminating an unnecessary dispatch is provided. The service orders generated by the service order control system are monitored to identify service orders that require a dispatch. If a service order is identified as requiring a dispatch, then the service order is selected for further analysis. The service order is initially analyzed to determine whether the service order meets a set of predefined criteria. The set of predefined criteria is selected to identify service orders that are likely to cause an unnecessary dispatch. If the service order meets the set of predefined criteria, then the service order is further analyzed to determine whether the dispatch associated with the service order is unnecessary and should be canceled. Once the dispatch is determined to be unnecessary, then the service order is corrected to eliminate the unnecessary dispatch.

In another aspect of the invention, a determination is made as to whether the dispatch associated with the service order should be placed on hold. The dispatch is placed on hold if the dispatch is scheduled to occur within a predefined time period, typically within the next 24 hours. If the determination is that the dispatch should be placed on hold, then the dispatch is put on hold so that the dispatch will not occur as scheduled.

The set of predefined criteria used to identify service orders that are likely to result in an unnecessary dispatch can be determined by an analysis of past dispatches to identify the characteristics of a service order that indicate a likelihood of an unnecessary dispatch. The fields or sections of the service order that are examined to determine whether the service order meets the set of predefined criteria typically include the assignment section, the listing section, the service and equipment section and the identification section. The set of predefined criteria are flexible and can be changed to accommodate changes in the systems that generate service requests, generate service orders and assign facilities.

These and other aspects, features and advantages of the present invention may be more clearly understood and appreciated from a review of the following detailed description of the disclosed embodiments and by reference to the appended drawings and claims.

DETAILED DESCRIPTION OF THE INVENTION

The present invention is directed to a system and method for eliminating the unnecessary dispatch of a service technician. The present invention can be used in connection with the existing processes and systems that are used to generate service orders and manage the dispatch of service technicians. Briefly described, the present invention monitors service orders generated by the service order control system to identify service orders that require a dispatch. If a service order is identified as requiring a dispatch, then the service order is selected for further analysis. The service order is initially analyzed to determine whether the service order meets a set of predefined criteria. The set of predefined criteria is selected to identify service orders that are likely to cause an unnecessary dispatch. The set of predefined criteria can be determined by an analysis of past dispatches to identify the characteristics of a service order that indicate a likelihood of an unnecessary dispatch. The set of predefined criteria are flexible and can be changed to accommodate changes in the systems and processes that generate service orders. If the service order meets the set of predefined criteria, then the service order is further analyzed to determine whether the dispatch associated with the service order is unnecessary and should be canceled. If the dispatch is determined to be unnecessary, then the service order is corrected to eliminate the unnecessary dispatch.

System for Monitoring Service Orders

Figure 1:
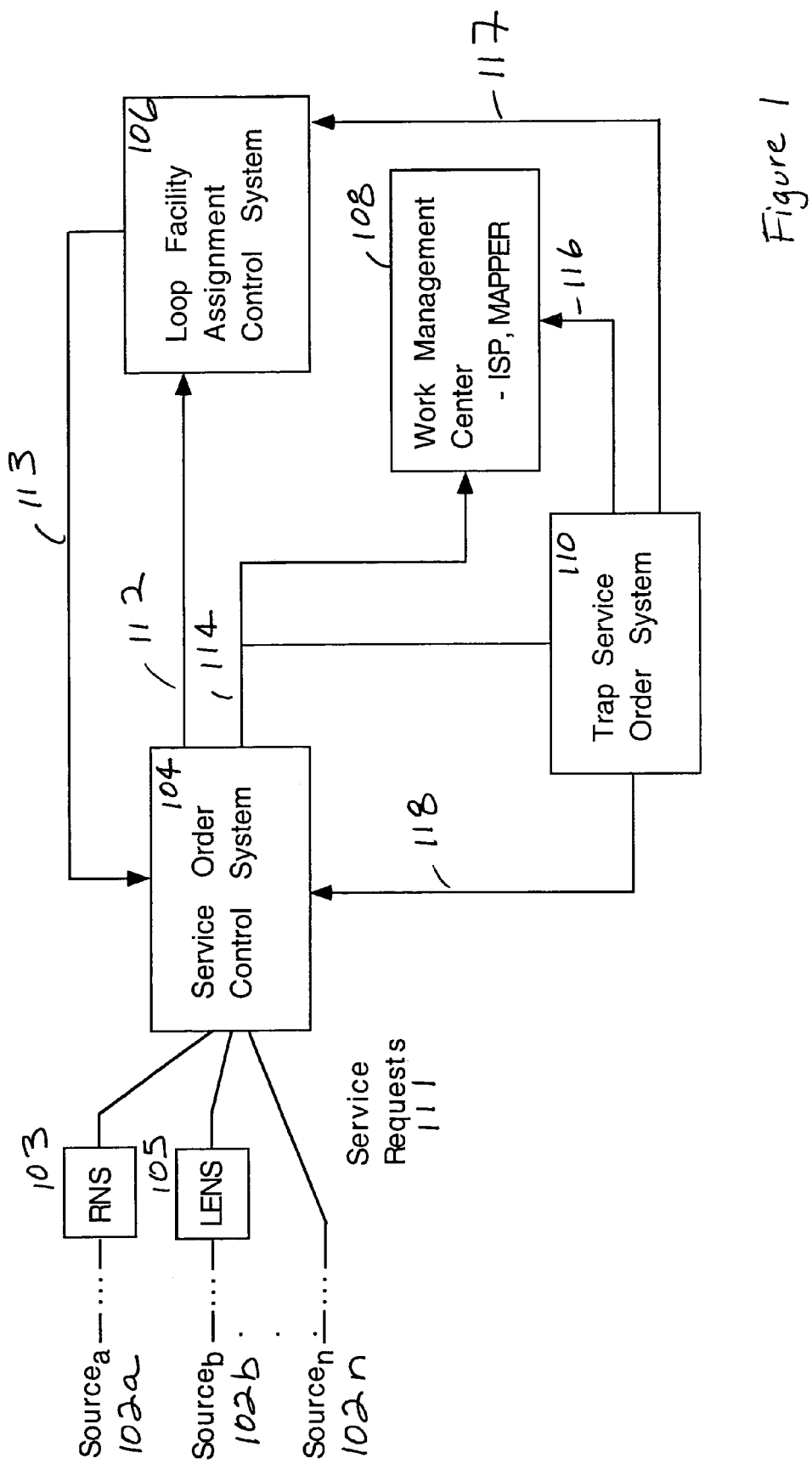
FIG. 1 is a block diagram illustrating an exemplary operating environment for an embodiment of the present invention.

FIG. 1 illustrates an exemplary system for monitoring service orders to eliminate unnecessary dispatches. Service requests 111 are generated by a number of different sources 102a, 102b . . . 102n. In an environment where there are a number of competitive local exchange carriers, the sources can correspond to different local exchange carriers. For example, source 102a can correspond to an incumbent local exchange carrier (ILEC) and source 102b can correspond to a competitive local exchange carrier (CLEC). In the exemplary system shown in FIG. 1, the requests from the ILEC are sent to a regional negotiating system (RNS) 103 prior to being sent to the service order control system 104 and the requests from the CLEC are sent to a local exchange negotiation system (LENS) 105 prior to being sent to the service order control system 104. In addition, a request from a CLEC may be validated by a regional street address guide (RSAG) database (not shown) prior to being sent to the service order control system.

The service order control system (SOCS) 104 reviews a service request and generates a service order for the received service request. In one embodiment, the service order includes a number of sections including a listing section, a billing section, a service and equipment (S&E) section, a remarks section, an assignment section, a status section, as well as a header and an identification (ID) section. The service order control system includes a database (not shown) that maintains information about the generated service orders.

Once a service order is generated, the service order is sent to the loop facility assignment control system (LFACS) 106 via input 112. The loop facility assignment control system assigns facilities for service orders that require facilities. The assignment of facilities is supported by a database in the loop facility assignment control system (not shown). For example, if a service request is directed to the installation of new service, the loop facility assignment control system references the database and assigns a cable pair for the installation. The assigned facilities are communicated to the service order control system via input 113 and the database in the service order control system is updated with the facilities information.

The service order control system then transmits the service order, including the facilities information to the integrated service process (ISP) in the work management center 108 via input 114. The ISP determines whether a service order requires the dispatch of a service technician. If so, then the ISP communicates with the MAPPER system and the MAPPER system generates a dispatch order. The dispatch order is assigned a number or other type of identifier for tracking purposes and is placed in a queue for execution.

The trap service order system 110 monitors the service orders output from the service order control system 104 to the ISP by receiving a duplicate drop of the service orders. The trap service order system determines whether a service order indicates that a dispatch is required. If the service order indicates that a dispatch is required, then the trap service order system further examines the service order to determine whether an unnecessary dispatch can be avoided.

If the trap service order system determines that an unnecessary dispatch can be avoided, then the trap service order system communicates with the service order control system 104 and possibly the loop facility assignment control system 106 and the ISP. The trap service order system communicates with the service order control system via input 118 to update or correct the database in the service order control system, communicates with the loop facility assignment control system via input 117 to update or correct the database in the loop facility assignment control system, and communicates with the MAPPER system via input 116 to place a dispatch order on hold.

If the database in the service order control system is updated or corrected, then the service order control system corrects the service order. The corrected service order is sent to the loop facility assignment control system and the loop facility assignment control system determines whether the corrected service order requires the assignment of facilities. If so, then the facilities are assigned and the database in the service order control system is updated with the facilities information. If the trap service order system updates the database in the loop facility assignment control system, then the loop facility assignment control system corrects or updates the assignment of facilities for the corrected service order. The corrected service order is also sent to the MAPPER system. The MAPPER system recognizes that the corrected service order corresponds to an existing dispatch order and cancels the existing dispatch order.

A dispatch order is placed on hold if the trap service order system determines that the dispatch might occur before a corrected service order can be generated and processed through the systems to cancel the existing dispatch order. By placing the dispatch order on hold, the dispatch will not occur as scheduled. Once the corrected service order is received by the MAPPER system, the existing dispatch order is canceled.

To determine whether a dispatch is unnecessary and to initiate a corrected service order, the trap service order system can use a number of different methods that use some, little or no human intervention. In one embodiment, the review of the service orders, the updates of the databases in the service order control system and the loop facility assignment control system, and the communication with the MAPPER system are performed automatically by the trap service order system. In another embodiment, a user can review service orders that have been identified as being likely to cause an unnecessary dispatch on a display device to determine whether a dispatch is unnecessary. The user can select certain types of service orders to review, such as service orders that are related to other service orders or service orders that include an override code. The selection of the types of service orders to review is performed by querying a database of service orders that have been identified as requiring a dispatch. In yet another embodiment, reports can be periodically generated to list service orders that are likely to cause an unnecessary dispatch. The reports are based upon the set of predefined criteria. The reports can be reviewed by a user to determine whether a service order requires an unnecessary dispatch. Once a service order has been identified as requiring an unnecessary dispatch, the communication with the service order control system and possibly the loop facility assignment control system and the MAPPER system can be performed automatically by the trap service order system or can be performed manually by a user of the trap service order system.

Method for Eliminating an Unnecessary Dispatch

Figure 2:
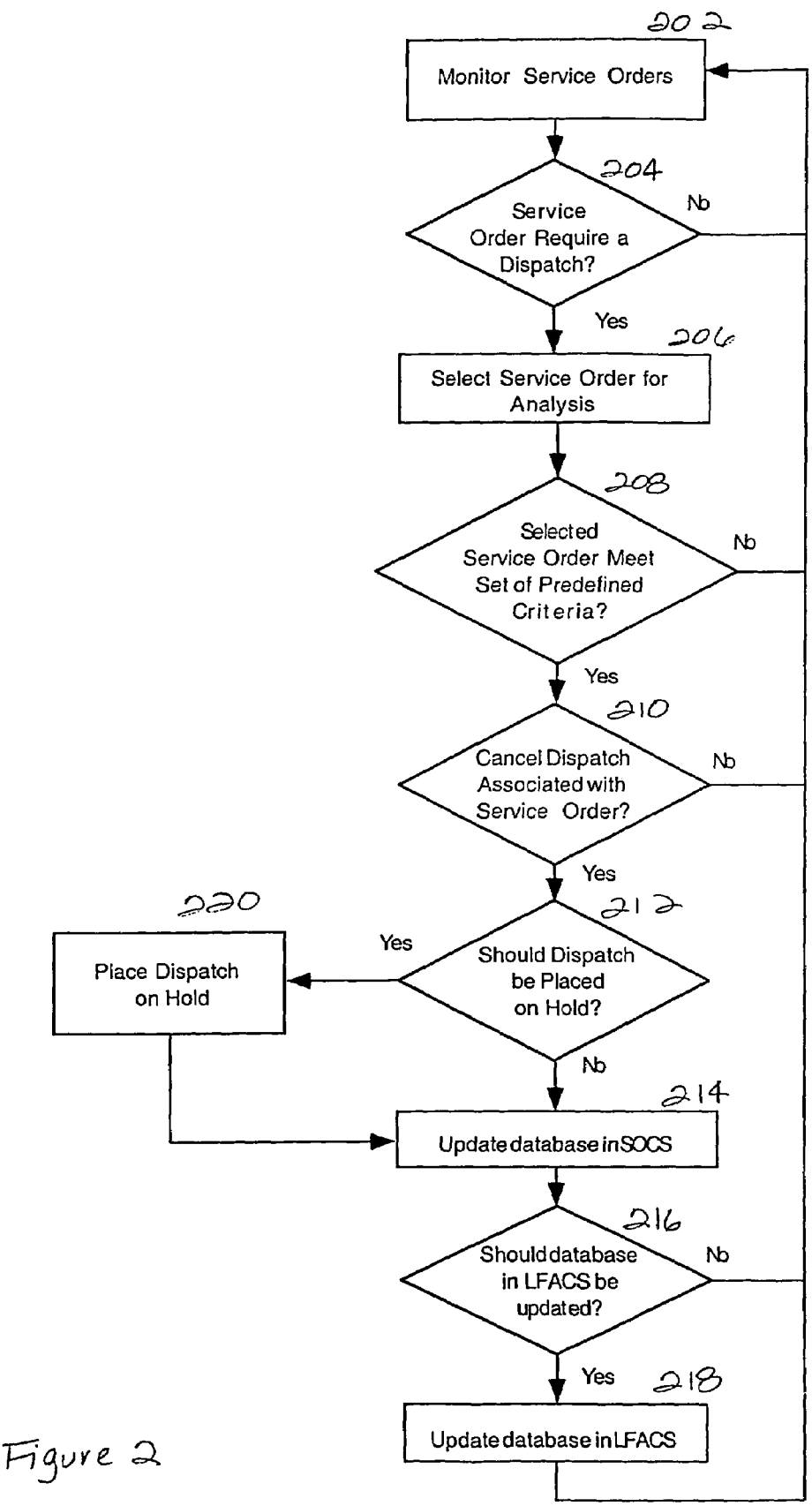
FIG. 2 is a flow diagram illustrating a method for eliminating an unnecessary dispatch, in accordance with an embodiment of the present information.

In FIG. 2, an exemplary method for eliminating an unnecessary dispatch is illustrated. The method is typically performed by a system, such as the trap service order system illustrated by FIG. 1. The method begins at step 202 where the service orders generated by the service order control system are monitored. In step 204 a determination is made as to whether a service order requires a dispatch. In one embodiment, the determination as to whether a service order requires a dispatch is made by examining the routing code in the header section of the service order and the work function code in the assignment section of the service order. This determination is the same determination that is made by the ISP to determine whether a dispatch is required. If the determination in step 204 is that the service order does not require a dispatch, then the No branch is followed back to step 202.

However, if the determination in step 204 is that the service order requires a dispatch, then the Yes branch is followed to step 206 and the service order is selected for further analysis. In step 208, a determination is made as to whether the service order meets a set of predefined criteria. The set of predefined criteria is selected to identify service orders that are likely to cause an unnecessary dispatch. To determine whether the service order meets the set of predefined criteria, selected sections of the service order are examined. For example, the ID section of the service order is examined to determine whether the service order includes an override code. An override code can be inserted by a source to force a dispatch. However, the override code is often misused by a source so a service order that includes the override code is likely to require an unnecessary dispatch. If the service order includes an override code, then the service order is identified as one that meets the set of predefined criteria.

The set of predefined criteria also include determining whether the service order is a reinstall/reconnect order for a former customer. One example of a reinstall/reconnect order is a port back order. A port back order occurs when a customer of a local exchange carrier switches to a competitive local exchange carrier and then returns to the original local exchange carrier. If the former customer is assigned facilities that are different from the facilities that were previously assigned, then an unnecessary dispatch is likely to occur. To determine whether the service order is a port back order, the former customer telephone number (FCTN) field of the listing section of the order is examined. If the FCTN field indicates that the service order is a port back order, then the service order is identified as one that meets the set of predefined criteria. As will be apparent to those skilled in the art, the set of predefined criteria can include other values and/or other selected fields and sections of the service order that indicate a likelihood of an unnecessary dispatch. For example, the set of predefined criteria can include examining the assignment section to determine the assigned facilities, comparing the service order to other service orders to identify duplicate service orders or any number of other criteria.

If the determination in step 208 is that the service order does not meet the set of predefined criteria, then the No branch is followed back to step 202. Otherwise, the Yes branch is followed to step 210. In step 210, the service order is further analyzed to determine whether the dispatch associated with the service order is unnecessary and should be canceled. For example, if the service order includes an override code, then the service order is reviewed to determine whether a dispatch is necessary.

If the determination is that the dispatch is not necessary, then the dispatch is canceled. If the service order is a port back order for a former customer, then the service order is reviewed to determine whether the service order assigns facilities that are different from the facilities that were previously assigned. If so, the service order is identified as one requiring an unnecessary dispatch because if the facilities were reused the dispatch could be saved.

If the determination in step 210 is that the dispatch associated with the service order is necessary, then the method returns to step 202. However, if the service order is identified as requiring an unnecessary dispatch, then the Yes branch is followed to step 212. In step 212, a determination is made as to whether the dispatch associated with the service order should be placed on hold. The dispatch is placed on hold if the dispatch is scheduled to occur within a predefined time period, typically within the next 24 hours. If the determination is that the dispatch should be placed on hold, then the Yes branch is followed to step 220. In step 220, the dispatch is put on hold so that the dispatch will not occur as scheduled. As described above in connection with FIG. 1, the dispatch is typically put on hold by communicating with the MAPPER system in the work management center.

Although FIG. 2 illustrates that the determination as to whether the dispatch order should be placed on hold occurs after the service order is identified as requiring an unnecessary dispatch, the determination can also be made at other times. For example, the determination as to whether the dispatch order should be placed on hold could be made after the determination is made in step 204 that the service order requires a dispatch. This would place the dispatch order on hold while the service order is examined to determine whether the dispatch order should be canceled. Alternatively, the determination as to whether the dispatch order should be placed on hold could be made after the determination is made in step 208 that the service order meets a set of predefined criteria.

Once the dispatch order has been put on hold in step 220, or if the determination in step 212 is that the dispatch order should not be put on hold, then the method proceeds to step 214. In step 214, the database in the service order control system is updated. By updating the database in the service order control system, the service order is corrected and the unnecessary dispatch is eliminated. Once the database in the service order control system is updated, then the method proceeds to step 216. In step 216 a determination is made as to whether the database in the loop facility assignment control system should be updated. The database in the loop facility assignment control system is updated if the facilities assignment needs to be modified to eliminate the dispatch. If the determination in step 216 is that the database in the loop facility assignment control system should be updated, then the method proceeds to step 218 and the database is updated. However, if the determination in step 216 is that the database does not need to be updated, then the method proceeds back to step 202.

Determining that a Service Order is Likely to Cause an Unnecessary Dispatch

The set of predefined criteria used to identify service orders in step 208 of FIG. 2 is typically determined by an analysis of past dispatches to identify the characteristics of a service order that indicate a likelihood of an unnecessary dispatch. There are generally two types of service orders, new installs and reinstalls/reconnects. The type of service order can be determined by examining the FCTN field of the listing section of the service order. The set of predefined criteria consider the type of service order, as well as the information included in selected fields or sections of the service order. The fields or sections of the service order that are examined to determine whether the service order meets the set of predefined criteria typically include the assignment section, the listing section, the S&E section and the ID section. The assignment section is examined to determine what facilities have been assigned and to determine whether there are any related orders. The listing section is examined to determine whether the service order is associated with a former customer. The S&E section is examined to determine whether the service order requests an additional line and to determine whether the order is a port back order.

In one embodiment, the set of predefined criteria include determining whether the order was initiated by the incumbent local exchange carrier or a competitive local exchange carrier. As illustrated by FIG. 1, a service request can be initiated by different sources that use different preprocessing systems. In the exemplary embodiment illustrated by FIG. 1, a service request from the incumbent local exchange carrier is processed by the RNS 103 system, whereas a service request from a competitive local exchange carrier is processed by the LENS 105 system and possibly the RSAG system (not shown). The different preprocessing can affect the definition of the set of predefined criteria.

In addition, the training received by employees of the incumbent local exchange carrier and a competitive local exchange carrier differ and can affect the definition of the set of predefined criteria. For example, if employees of a particular competitive local exchange carrier are trained to complete service requests in a manner that increases the likelihood of an unnecessary dispatch, then the set of predefined criteria include an examination of the service order to determine whether the service order was generated by the competitive local exchange carrier, as well as an examination of those fields or sections of the service order that can cause an unnecessary dispatch due to the manner of completion. Because the source of the service request can affect the set of predefined criteria, different fields or sections of the service order can be examined based upon the source.

The set of predefined criteria is flexible and can be modified as necessary. For example, if the preprocessing of a service request changes, then the fields or sections of the service order that need to be examined to determine whether an unnecessary dispatch can also change. The set of predefined criteria can be changed to specify different or additional fields and sections of the service order to accommodate the changes in the preprocessing.

If the set of predefined criteria is determined by an analysis of past dispatches, then the set of predefined criteria can also be used to identify problems with the source systems, the service order control system or the loop facility assignment control system. Even though a problem is identified, determining and implementing a solution to the problem can take time. The use of the set of predefined criteria to analyze service orders insures that an unnecessary dispatch does not occur while a solution to the problem is implemented at another system.

Additional alternative embodiments will be apparent to those skilled in the art to which the present invention pertains without departing from its spirit and scope. For example, additional or alternative criteria can be used to determine that a service order is likely to cause an unnecessary dispatch. Accordingly, the scope of the present invention is described by the appended claims and is supported by the foregoing description.

What is claimed is:

1. A method for eliminating an unnecessary dispatch of a service technician, comprising:
   receiving a service order at a work management center, wherein the service order is generated from a service request sent by a source;
   determining, at the work management center, that the service order requires a dispatch of a service technician;
   responsive to determining that the service order requires a dispatch of a service technician, generating a dispatch order for the dispatch of a service technician and placing the dispatch order in a queue for execution;
   receiving a duplicate of the service order at a trap service order system;
   after the dispatch order is placed in the queue for execution, determining at the trap service order system, whether the service order requires a dispatch of a service technician;
   selecting a set of predefined criteria for determining whether the service order is likely to cause an unnecessary dispatch based on the source of the service request associated with the service order;
   responsive to determining that the service order requires a dispatch of a service technician, determining, at the trap service order system, whether the service order meets the set of predefined criteria that indicates a likelihood of an unnecessary dispatch by examining selected sections of the service order;
   responsive to determining that the service order meets the set of predefined criteria, determining, at the trap service order system, whether the dispatch is unnecessary;
   responsive to determining that the dispatch is unnecessary, determining at the trap service order system, whether the dispatch associated with the service order in the queue is scheduled to occur within a predetermined time period;
   responsive to determining that the dispatch is scheduled to occur within a predetermined time period:
      placing the dispatch order in the queue on hold;
      generating a corrected service order;
      determining whether the corrected service order corresponds to the dispatch order generated in response to the service order; and
      responsive to determining that the corrected service order corresponds to the dispatch order, canceling the dispatch order.

2. The method of claim 1, wherein the source is a local exchange carrier.

3. The method of claim 1, wherein determining whether the service order meets a set of predefined criteria comprises:
   determining whether the service order includes an override code requiring dispatch of a service technician regardless of a dispatch determination by a work management center.

4. The method of claim 1, wherein determining whether the service order meets a set of predefined criteria comprises:
   determining whether the service order is related to a second pending service order.

5. The method of claim 1, wherein determining whether the service order meets a set of predefined criteria comprises:
   determining whether the service order includes an assignment of facilities.

6. The method of claim 5, wherein determining whether the service order indicates that a dispatch is unnecessary comprises:
   determining whether the assignment of facilities uses the same facilities that were previously assigned to a location associated with the service order.

7. The method of claim 1, wherein determining whether the dispatch is unnecessary comprises:
   in response to receiving a query based upon selected ones of the predefined criteria, searching a database of pending service orders that indicate a dispatch is required to locate service orders that meet the selected predefined criteria; and
   providing the service orders that meet the selected predefined criteria.

8. The method of claim 1, wherein determining whether the dispatch is unnecessary comprises:
   periodically generating a report based upon selected ones of the predefined criteria that includes all service orders that meet the selected predefined criteria.

9. The method of claim 1, wherein the set of predefined criteria is selected based upon an analysis of past dispatches.

10. The method of claim 1, wherein the set of predefined criteria includes determining whether the service order is a new install or reinstall/reconnect.

11. The method of claim 1, wherein correcting the service order comprises updating a database associated with a service order control system.

12. The method of claim 1, wherein the service order is for a new install.

13. The method of claim 1, wherein the service order is for a reinstall/reconnect.

14. A system for eliminating unnecessary dispatches, comprising:
   a service order control system:
   receive service requests from a source; and
   generate a service order based on one of the service requests from the source;
   a work management center:
   receiving the service order from the service order control system;
   determining that the service order requires a dispatch of a service technician; and
   in response to determining that the service order requires a dispatch, generate a dispatch order corresponding to the service for the dispatch and place the dispatch order in a queue for execution; and
   a trap service order system:
   receiving a duplicate of the service order from the service control system;
   after the work management center places the dispatch order in a queue for execution, determining whether the service order requires a dispatch of a service technician;
   selecting a set of predefined criteria for determining whether the service order is likely to cause an unnecessary dispatch based on the source of the service request associated with the service order;
   in response to determining that the service order requires a dispatch, determine whether the service order meets a set of predefined criteria that indicates the service order is likely to cause an unnecessary dispatch;
   in response to determining that the service order meets the set of predefined criteria, then further examine the service order to determine whether the dispatch is unnecessary;

in response to determining that the dispatch is unnecessary, then determine whether the dispatch of a service technician associated with the dispatch order in the queue is scheduled to occur within a predetermined time period; and in response to determining that the dispatch is scheduled to occur within the predetermined time period, then communicate with the work management center to place the dispatch order on hold.

15. The system of claim 14, further comprising a loop facility assignment control system receiving the service order and for assigning facilities the service order, wherein if the trap service order system determines that the dispatch is unnecessary, then the trap service order system communicates with the loop facility assignment control system to update a database in the loop facility assignment control system.

16. The system of claim 14, wherein if the trap service order system determines that the dispatch is unnecessary, then the trap service order system communicates with the service order control system to update a database in the service order control system.

17. The system of claim 16, wherein the service order control system generates a corrected service order which cancels the dispatch, in response to the database update.

18. The system of claim 14, wherein the trap service order system identifies all service orders that require a dispatch and that meet a set of predefined criteria.

19. The system of claim 14, wherein the service order is for a new install.

20. The system of claim 14, wherein the service order is for a reinstall/reconnect.

21. The system of claim 14, wherein the service order control system generates a corrected service order and wherein the work management center determines whether the corrected service order corresponds to the dispatch order and if the corrected service order corresponds to the dispatch order, then the work management center cancels the dispatch order.

22. A system for eliminating unnecessary dispatches, comprising:

a service order control system:

receiving service requests from the source;

generating a service order based on one of the service requests from the source; and generating a corrected service order in response to a communication from a trap service order system;

a work management center:

receiving the service order from the service order control system;

determining that the service order requires a dispatch of a service technician;

in response to determining that the service order requires a dispatch of a service technician, generating a dispatch order for the dispatch and place the dispatch order in a queue for execution;

receiving the corrected service order from the service order control system;

determining whether the corrected service order corresponds to the dispatch order; and in response to determining that the corrected service order corresponds to the dispatch order, canceling the dispatch order; and the trap service order system:

receiving a duplicate of the service order from the service control system;

after the work management center places the dispatch order in the queue for execution, determining whether the service order requires a dispatch of a service technician;

selecting a set of predefined criteria for determining whether the service order is likely to cause an unnecessary dispatch based on the source of the service request associated with the service order;

in response to determining that the service order requires the dispatch of the service technician, comparing a service order type and information in the selected field of the service order with the set of predefined criteria that indicates the service order is likely to cause an unnecessary dispatch;

in response to determining that the service order type and information in the selected field of the service order meet the set of predefined criteria, further examining the service order to determine whether the dispatch is unnecessary;

in response to determining that the dispatch is unnecessary, determining whether the dispatch of a service technician associated with the dispatch order in the queue is scheduled to occur within a predetermined time period; and in response to determining that the dispatch is scheduled to occur within the predetermined time period, communicating with the work management center to place the dispatch order on hold and communicate with the service order control system to generate the corrected service order.

* * * * *